UNITED STATES PATENT OFFICE.

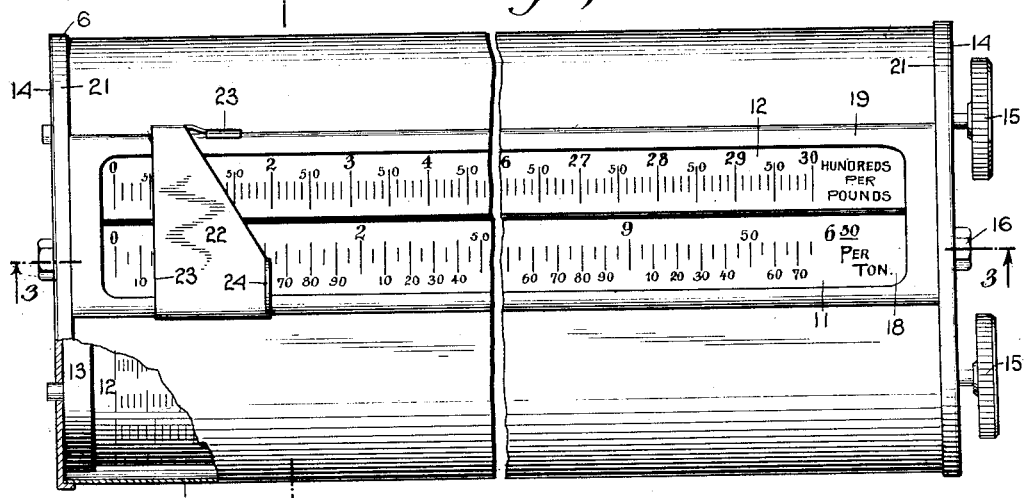

GUY MELVILLE MILNER, OF BUHL, IDAHO.

COMPUTER.

1,209,474.

Specification of Letters Patent.

Patented Dec. 19, 1916.

Application filed December 29, 1915. Serial No. 69,162.

*To all whom it may concern:*

Be it known that I, GUY M. MILNER, a citizen of the United States, and a resident of Buhl, in the county of Twin Falls and State of Idaho, have invented a new and Improved Computer, of which the following is a full, clear, and exact description.

My invention relates to computers designed to indicate at a glance the price of a commodity dispensed by weight.

The object of the invention is to provide a simple, convenient and inexpensive computer which will afford a quick and sure determination of the price or prices of commodities dispensed by weight at rates that may vary.

Figure 1 is a plan view of a computer embodying my invention, a certain part of the device being broken away to show the details of construction; Fig. 2 is a cross section of the device on line 2 2, Fig. 1; Fig. 3 is a longitudinal cross section on line 3 3, Fig. 1; and Fig. 4 is a perspective view of the indicator.

Referring to the drawings, 5 is the body of the computer case, which comprises two compartments 6 6 which are spaced by the raised bottom of the body forming a bridge 7 in the longitudinal open top 8 of the body. The edges 9 and 10 of the body at the opening in the top are upturned or folded, the edge being folded far enough to form a flat surface for receiving a fixed scale 11. The rounded edges in the top are spaced from the rounded corners of the bridge 7 to allow the passage of the movable chart 12 from one compartment to the other over the bridge 7. The chart is wound on rollers 13 13 mounted in the respective compartments 6 6 and bearing in the dished end plates 14 of the case which close the ends of the computer body 5. Knob heads 15 are provided at the ends of the roller shaft projecting out of the end plates, whereby the chart 12 may be moved across the bridge 7.

The end plates 14 are maintained against the body by a draw bolt 16 provided between the compartments 6 6. To prevent any lateral movement of the chart relative to the fixed scale 11, when the chart is moved over the bridge, the bridge 7 is provided with end projections 17 engaging the edges of the chart.

The fixed scale and the portion of the chart on the bridge are covered by a transparent member 18 mounted in an elongated window frame 19, the longitudinal edges of which are folded inwardly to engage the folded edges 9 and 10 of the computer body. The end edges 20 of said frame 19 are turned inwardly to be engaged by the flanged edges 21 of the end plates 14 (see Fig. 3) whereby the frame 19 is locked on the body of said end plates.

An indicator 22 is slidably mounted on the frame 19 along the longitudinal edges of the frame. The indicator has a resilient portion 23 bearing against one of the longitudinal edges of the frame 19 whereby a certain effort is necessary to cause the displacement of the indicator on the frame. The indicator has also a thumb piece 24 for facilitating the displacement of the indicator on the frame.

By providing the projections 17 on the bridge 7 the chart is always maintained in proper relation to the fixed scale 11 which is carried by the body. By raising the bottom of the body 5 to form the bridge 7 at the top of the body a more rigid case results, as end plates 14 which extend across the two compartments are braced in the middle by said raised bottom.

It will be noted that all parts of the device are assembled by means of a single bolt 16.

I claim:

1. A computer comprising a casing having an opening in its top and a bridge in said opening, rollers mounted in the casing at each side of the bridge, a chart carried by the rollers and passing over the bridge the edges of the said opening disposed adjacent the sides of the bridge forming guide throats for the said chart, a scale at one side of the said opening, an open frame secured to the top of the casing and a transparent plate carried by the frame and overlying the aforesaid opening and said scale.

2. In a computer, a casing having an opening in its top, the edges of said opening folded outwardly and spaced from the top of the casing, one of which folded edges is adapted to support a scale, an open frame having its longitudinal edges folded inwardly and extending between the folded edges of the opening and the top of the case, and a transparent plate carried by the frame.

3. In a computer, a casing having a longitudinal opening in its top, the edges of the opening being folded outwardly and spaced from the top of the casing, a scale on one of the folded edges, an elongated open frame having its longitudinal edges folded inwardly and extending between the folded edges of the opening and the top of the casing, and a transparent plate having its edges clamped between the top of the frame and the folded edges of the said opening.

In testimony whereof I have signed my name to this specification in the presence of two subscribing witnesses.

GUY MELVILLE MILNER.

Witnesses:
BEN E. WILLIAMSON,
E. A. MILNER.